(12) United States Patent
Shiimori

(10) Patent No.: US 7,714,906 B2
(45) Date of Patent: May 11, 2010

(54) IMAGE PROCESSING APPARATUS AND IMAGE PROCESSING PROGRAM FOR CREATING FIRST IMAGE GROUPS BASED ON PHOTOGRAPHING TIME AND CREATING SECOND IMAGE GROUPS FROM THE FIRST IMAGE GROUPS

(75) Inventor: Yoshiko Shiimori, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 413 days.

(21) Appl. No.: 11/896,882

(22) Filed: Sep. 6, 2007

(65) Prior Publication Data
US 2008/0062282 A1 Mar. 13, 2008

(30) Foreign Application Priority Data
Sep. 8, 2006 (JP) ............................. 2006-244467

(51) Int. Cl.
H04N 5/76 (2006.01)
(52) U.S. Cl. .................................. 348/231.2
(58) Field of Classification Search .............. 348/231.2, 348/231.3, 231.5, 231.6, 231.99, 222.1, 207.99
See application file for complete search history.

(56) References Cited

U.S. PATENT DOCUMENTS

| | | | | |
|---|---|---|---|---|
| 5,796,428 A | * | 8/1998 | Matsumoto et al. | 348/207.99 |
| 6,229,566 B1 | * | 5/2001 | Matsumoto et al. | 348/231.2 |
| 6,965,403 B2 | * | 11/2005 | Endo | 348/231.2 |
| 7,184,082 B2 | * | 2/2007 | Yokokawa | 348/231.2 |
| 2001/0028394 A1 | * | 10/2001 | Matsumoto et al. | 348/207 |
| 2002/0154221 A1 | * | 10/2002 | Ishimaru | 348/207.1 |
| 2003/0033296 A1 | * | 2/2003 | Rothmuller et al. | 707/3 |
| 2003/0117651 A1 | | 6/2003 | Matraszek et al. | |
| 2003/0122839 A1 | | 7/2003 | Matraszek et al. | |
| 2003/0128389 A1 | | 7/2003 | Matraszek et al. | |
| 2004/0145602 A1 | * | 7/2004 | Sun et al. | 345/720 |
| 2006/0256382 A1 | | 11/2006 | Matraszek et al. | |

FOREIGN PATENT DOCUMENTS

| | | |
|---|---|---|
| EP | 1324227 A2 | 7/2003 |
| EP | 1762949 A2 | 3/2007 |
| JP | 2003-233624 A | 8/2003 |

* cited by examiner

Primary Examiner—Jason Chan
Assistant Examiner—Nicholas G Giles
(74) Attorney, Agent, or Firm—Birch, Stewart, Kolasch & Birch, LLP

(57) ABSTRACT

According to the present invention, groups each of whose number of photographed image data is large and whose photographing dates/times are consecutive are integrated as an important group, so that image data, for example, corresponding to a series of images photographed during event or the like over a few days can be classified into an important group automatically, and a level of importance of the image data can be calculated. Thereby, retrieving of stored images is facilitated and utilization rate of images can be increased.

56 Claims, 6 Drawing Sheets

IMAGE PROCESSING APPARATUS AND IMAGE PROCESSING PROGRAM FOR CREATING FIRST IMAGE GROUPS BASED ON PHOTOGRAPHING TIME AND CREATING SECOND IMAGE GROUPS FROM THE FIRST IMAGE GROUPS

BACKGROUND OF THE INVENTION

1. Field of the Invention

The present invention relates to an image processing apparatus and an image processing program, and particularly to a technology for storing an image in a manner that the image can be easily retrieved.

2. Description of the Related Art

In Japanese Patent Application Laid-Open No. 2003-233624, there is proposed that a method for facilitating image retrieving by associating a digital image with emotional information and a user identifier.

In recent years, as electronic cameras and camera cell phones become popular, there are many opportunities to capture images, and image data is stored in various media such as a memory of an electronic camera, a memory of a cell phone, and a personal computer (PC). Such images are generally stored in a hard disk device, a CD or the like.

SUMMARY OF THE INVENTION

However, as image data to be saved increases, selecting of images for organization, secondary use, and the like of the images becomes troublesome, and therefore, under the present conditions, large amounts of captured and stored image data are mostly unused and left intact.

The present invention is made in view of such circumstances, and is intended to provide an image processing apparatus and an image processing program configured to facilitate retrieving of stored images and increase utilization rate of images.

To solve the above described problem, an image processing apparatus according to a first aspect of the present invention comprises: an image storing device which stores image data; a grouping device which groups the image data into groups on the basis of photographing time unit based on time information that indicates date/time at which the image data is photographed, and, if there are groups each of whose number of image data is greater than or equal to a first threshold and whose photographing times are consecutive, generates a group which integrates the consecutive groups; a photographing frequency calculating device which calculates a photographing frequency that indicates the number of photographed images per unit time of image data belonging to the group generated by the grouping; an important group setting device which sets the group whose photographing frequency is greater than or equal to a second threshold to an important group; and a group information recording device which records information of the group to which the image data belongs.

According to the first aspect of the present invention, groups each of whose number of photographed image data is large and whose photographing dates/times are consecutive are integrated as an important group, so that image data, for example, corresponding to a series of images photographed during event or the like over a few days can be classified into an important group automatically, and classified group information can be added to the image data. By using this group information, the image data can be easily retrieved.

An image processing apparatus according to a second aspect of the present invention comprises: an image storing device which stores image data; a primary grouping device which groups the image data into a primary groups on the basis of a first photographing time unit and, if there are primary groups each of whose number of the image data is greater than or equal to a first threshold and whose photographing times are consecutive, generates a primary group which integrates the consecutive primary groups; a primary important group setting device which sets the primary group whose number of image data is greater than or equal to a second threshold to a primary important group; a secondary grouping device which groups an image belonging to the primary important group into a secondary groups on the basis of a second photographing time unit that is shorter than the first photographing time unit, and, if there are secondary groups each of whose number of the image data is greater than or equal to a third threshold and whose photographing times are consecutive, generates a secondary group which integrates the consecutive secondary groups; a photographing frequency calculating device which calculates a photographing frequency that indicates the number of photographed images per unit time of image data belonging to the secondary group generated by the grouping; a secondary important group setting device which sets the secondary group whose photographing frequency is greater than or equal to a fourth threshold to a secondary important group; and a group information recording device which records information of the group to which the image data belongs.

According to the second aspect, a first important group can be grouped into a secondary group on the basis of the shorter second photographing time unit. By using this group information, important image data can be easily retrieved.

A third aspect of the present invention is the image processing apparatus according to the first or second aspect, wherein the group information recording device records the group information in additional information of the image data or metadata different from the image data.

According to the third aspect, important image data can be easily retrieved by recording group information in additional information of an image or metadata.

A fourth aspect of the present invention is the image processing apparatus according to any one of the first to third aspects, further comprising: a backup device which backs up the image data stored in the image storing device to another storing device; and a backup instruction device which gives an instruction to execute the backup, wherein the group information recording device records the group information if the instruction to execute the backup is given.

According to the fourth aspect, by grouping backup target image data as a whole when images are backed up to an optical disk or the like, the image data in a storing device of a backup destination can be easily retrieved.

A fifth aspect of the present invention is the image processing apparatus according to any one of the first to third aspects, further comprising: a view instruction device which gives an instruction to view image data stored in the image storing device; and an image displaying device which displays the image data so as to clearly indicate the group information if the instruction to view the image data is given.

According to the fifth aspect, by clearly indicating group information of view target image data when the image data is viewed, the view target image data can be easily retrieved.

An image processing apparatus according to sixth aspect of the present invention comprises: an image storing device which stores image data; a usage information acquiring device which acquires usage information that indicates usage status of the image; a grouping device which groups the image data into groups on the basis of photographing time unit based on time information that indicates date/time at which the image data is photographed, and, if there are groups each of whose number of image data is greater than or equal to a first threshold and whose photographing times are consecutive, generates a group that integrates the consecutive groups; a photographing frequency calculating device which calculates a photographing frequency that indicates the number of photographed images per unit time of image data belonging to the group generated by the grouping; an important group setting device which sets the group whose photographing frequency is greater than or equal to a second threshold to an important group; a point assignment device which assigns an importance level point to the image data based on the usage information and the group to which the image data belongs; and an importance level point information recording device which records importance level point information assigned to the image data.

According to the sixth aspect, an image can be easily retrieved based on importance level point in consideration of usage information in addition to time information of the image data.

An image processing apparatus according to seventh aspect of the present invention comprises: an image storing device which stores image data; a usage information acquiring device which acquires usage information that indicates usage status of the image; a primary grouping device which groups the image data into a primary groups on the basis of a first photographing time unit and, if there are primary groups each of whose number of the image data is greater than or equal to a first threshold and whose photographing times are consecutive, generates a primary group which integrates the consecutive primary groups; a primary important group setting device which sets the primary group whose number of image data is greater than or equal to a second threshold to a primary important group; a secondary grouping device which groups an image belonging to the primary important group into a secondary groups on the basis of a second photographing time unit that is shorter than the first photographing time unit, and, if there are secondary groups each of whose number of the image data is greater than or equal to a third threshold and whose photographing times are consecutive, generates a secondary group which integrates the consecutive secondary groups; a photographing frequency calculating device which calculates a photographing frequency that indicates the number of photographed images per unit time of image data belonging to the secondary group generated by the grouping; a secondary important group setting device which sets the secondary group whose photographing frequency is greater than or equal to a fourth threshold to a secondary important group; a point assignment device which assigns an importance level point to the image data based on the usage information and the group to which the image data belongs; and an importance level point information recording device which records importance level point information assigned to the image data.

According to the seventh aspect, a first important group is grouped into a secondary group on the basis of the further shorter second photographing time unit, and an important level point in consideration of usage information is applied to this grouping result, and thereby an image can be easily retrieved.

An eighth aspect of the present invention is an image processing apparatus according to sixth or seventh aspect, wherein the usage information acquiring device acquires information of at least one of the number of times of viewing, the number of times of full-screen display, and the number of times of copying with respect to the image data.

According to the eighth aspect, image data can be easily retrieved by assigning an importance level point to image data whose number of times of viewing, full-screen display, or copying is large and therefore whose usage frequency is high.

A ninth aspect of the present invention is the image processing apparatus according to any one of the sixth to eighth aspect, wherein the importance level point recording device records the importance level point information in additional information of the image data or metadata different from the image data.

According to the ninth aspect, important image data can be easily retrieved by recording importance level point information in additional information of an image or metadata.

A tenth aspect of the present invention is the image processing apparatus according to any one of the sixth to ninth aspects, further comprising: a backup device which backs up the image data stored in the image storing device to another storing device; and a backup instruction device which gives an instruction to execute the backup, wherein the importance level point recording device records the importance level point if the instruction to execute the backup is given.

According to the tenth aspect, by assigning an importance level to backup target image data when an image is backed up to an optical disk or the like, the image data in a storing device of a backup destination can be easily retrieved.

An eleventh aspect of the present invention is the image processing apparatus according to any one of the sixth to ninth aspects, further comprising: a view instruction device which gives an instruction to view image data stored in the image storing device; and an image displaying device which displays the image data so as to clearly indicate the importance level point information if the instruction to view the image data is given.

According to the eleventh aspect, by clearly indicating importance level point information of view target image data when the image data is viewed, the view target image data can be easily retrieved.

An image processing program according to a twelfth aspect of the present invention causes a computer to implement: an image storing function of storing image data; a grouping function which groups the image data into groups on the basis of photographing time unit based on time information that indicates date/time at which the image data is photographed, and, if there are groups each of whose number of image data is greater than or equal to a first threshold and whose photographing times are consecutive, generates a group which integrates the consecutive groups; a photographing frequency calculating function of calculating a photographing frequency that indicates the number of photographed images per unit time of image data belonging to the group generated by the grouping; an important group setting function of setting the group whose photographing frequency is greater than or equal to a second threshold to an important group; and a group information recording function of recording information of the group to which the image data belongs.

An image processing program according to a thirteenth aspect of the present invention causes a computer to implement: an image storing function of storing image data; a primary grouping function which groups the image data into a primary groups on the basis of a first photographing time unit and, if there are primary groups each of whose number of the image data is greater than or equal to a first threshold and whose photographing times are consecutive, generates a primary group which integrates the consecutive primary groups; a primary important group setting function which sets the primary group whose number of image data is greater than or equal to a second threshold to a primary important group; a secondary grouping function which groups an image belonging to the primary important group into a secondary groups on the basis of a second photographing time unit that is shorter than the first photographing time, and, if there are secondary groups each of whose number of the image data is greater than or equal to a third threshold and whose photographing times are consecutive, generates a secondary group which integrates the consecutive secondary groups; a photographing frequency calculating function of calculating a photographing frequency that indicates the number of photographed images per unit time of image data belonging to the secondary group generated by the grouping; a secondary important group setting function of setting the secondary group whose photographing frequency is greater than or equal to a fourth threshold to a secondary important group; and a group information recording function of recording information of the group to which the image data belongs.

A fourteenth aspect of the present invention is the image processing program according to the twelfth or thirteenth aspect, wherein the group information recording function records the group information in additional information of the image data or metadata different from the image data.

A fifteenth aspect of the present invention is the image processing program according to any one of the twelfth to fourteenth aspects which causes the computer to implement: a backup function of backing up the image data stored with the image storing function to another storing function; a backup instruction function which gives an instruction to execute the backup; a function which records the group information by the group information recording function if the instruction to execute the backup is given.

A sixteenth aspect of the present invention is the image processing program according to any one of the twelfth to fourteenth aspects which causes the computer to implement: a view instruction function which gives an instruction to view image data stored with the image storing function; and an image displaying function which displays the image data so as to clearly indicate the group information if the instruction to view the image data is given.

An image processing program according to a seventeenth aspect of the present invention causes a computer to implement: an image storing function which stores image data; a usage information acquiring function which acquires usage information that indicates usage status of the image; a grouping function which groups the image data into groups on the basis of photographing time unit based on time information that indicates date/time at which the image data is photographed, and, if there are groups each of whose number of image data is greater than or equal to a first threshold and whose photographing times are consecutive, generates a group that integrates the consecutive groups; a photographing frequency calculating function which calculates a photographing frequency that indicates the number of photographed images per unit time of image data belonging to the group generated by the grouping; an important group setting function which sets the group whose photographing frequency is greater than or equal to a second threshold to an important group; a point assignment function which assigns an importance level point to the image data based on the usage information and the group to which the image data belongs; and an importance level point information recording function which records importance level point information assigned to the image data.

An image processing program according to an eighteenth aspect of the present invention causes a computer to implement: an image storing function which stores image data; a usage information acquiring function which acquires usage information that indicates usage status of the image; a primary grouping function which groups the image data into a primary groups on the basis of a first photographing time unit and, if there are primary groups each of whose number of the image data is greater than or equal to a first threshold and whose photographing times are consecutive, generates a primary group which integrates the consecutive primary groups; a primary important group setting function which sets the primary group whose number of image data is greater than or equal to a second threshold to a primary important group; a secondary grouping function which groups an image belonging to the primary important group into a secondary groups on the basis of a second photographing time unit that is shorter than the first photographing time unit, and, if there are secondary groups each of whose number of the image data is greater than or equal to a third threshold and whose photographing times are consecutive, generates a secondary group which integrates the consecutive secondary groups; a photographing frequency calculating function which calculates a photographing frequency that indicates the number of photographed images per unit time of image data belonging to the secondary group generated by the grouping; a secondary important group setting function which sets the secondary group whose photographing frequency is greater than or equal to a fourth threshold to a secondary important group; a point assignment function which assigns an importance level point to the image data based on the usage information and the group to which the image data belongs; and an importance level point information recording function which records importance level point information assigned to the image data.

A nineteenth aspect of the present invention is an image processing program according to seventeenth or eighteenth aspect, wherein the usage information acquiring function acquires information of at least one of the number of times of viewing, the number of times of full-screen display, and the number of times of copying with respect to the image data.

A twentieth aspect of the present invention is an image processing program according to any one of seventeenth to nineteenth aspects, wherein the importance level point recording function records the importance level point information in additional information of the image data or metadata different from the image data.

A twenty-first aspect of the present invention is an image processing program according to any one of seventeenth to twentieth aspects which causes the computer to implement: a backup function which backs up the image data stored with the image storing function to another storing function; and a backup instruction function which gives an instruction to execute the backup; and a function which records the importance level point if the instruction to execute the backup is given.

A twenty-second aspect of the present invention is an image processing program according to any one of seventeenth to twentieth aspects which causes the computer to implement: a view instruction function which gives an instruction to view image data stored with the image storing function; and an image displaying function which displays the image data so as to clearly indicate the importance level point information if the instruction to view the image data is given.

According to the present invention, groups each of whose number of photographed image data is large and whose photographing dates/times are consecutive are integrated as an important group, so that image data, for example, corresponding to a series of images photographed during event or the like over a few days can be classified into an important group automatically, and a level of importance of the image data can be calculated. Thereby, retrieving of stored images is facilitated and utilization rate of images can be increased.

DETAILED DESCRIPTION OF THE PREFERRED EMBODIMENTS

Hereinafter, preferred embodiments of an image processing apparatus and an image processing program according to the present invention will be described with reference to the drawings.

[Configuration of Image Processing Apparatus]

Figure 1:
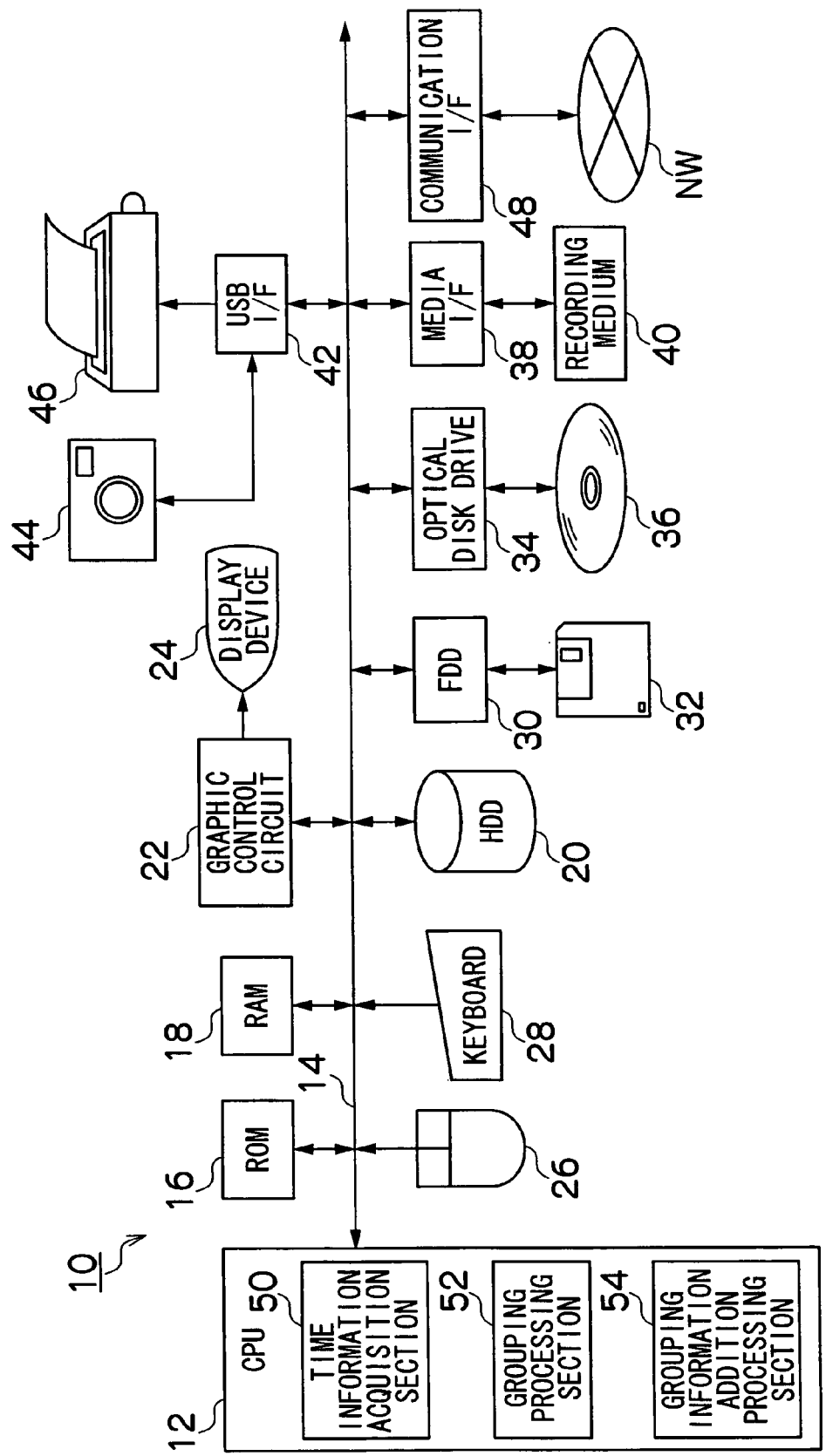
FIG. 1 is a block diagram which shows main components of an image processing apparatus according to a first embodiment of the present invention.

FIG. 1 is a block diagram which shows main components of an image processing apparatus according to a first embodiment of the present invention. An image processing apparatus 10 is composed of, for example, a personal computer (PC) and like, and is a device for storage, editing, print order, and the like of an image.

As shown in FIG. 1, a central processing unit (CPU) 12 is connected to each block in the image processing apparatus 10 through a bus 14, and controls operation of each block. In a ROM 16, a program executed by the CPU 12 and various data and the like required for control is stored. A RAM 18 is used as a deployment area of programs and a work area where the CPU 12 performs various processing.

In a hard disk device (HDD) 20, an operating system (OS) of the image processing apparatus 10, an image processing program according to the present invention, various application software, an image file, and the like are stored.

A graphic control circuit 22 converts an image signal inputted from the CPU 12 or the like into a signal format for display and outputs it to a display device 24. The display device 24 is, for example, a CRT (Cathode Ray Tube) monitor or an LCD monitor, and displays an image, a character, and the like outputted from the graphic control circuit 22.

A mouse 26 and a keyboard 28 are operating members which accept operation inputs from a user, and inputs a signal according to an operation input to the CPU 12. As a pointing device, a touch panel, a touch pad, or the like may be used aside from the mouse 26.

A flexible disk drive (FDD) 30 reads/writes data from/to a flexible disk 32.

An optical disk drive 34 reads/writes data from/to an optical disk 36 such as CD-ROM, CD-R/RW, DVD-ROM, and DVD-R/RW. The image processing program according to the present invention can be installed in the image processing apparatus 10 by setting the optical disk 36 on which the image processing program is recorded in the optical disk drive 34.

A media interface section (media I/F) 38 sends/receives data to/from a recording medium 40. As a type of the recording medium 40, various media can be used including a semiconductor memory card such as an xD picture card™ and a SmartMedia™, a small portable hard disk, a magnetic disk, an optical disk, a magnet-optical disk.

A USB interface section (USB_I/F) 42 sends/receives data to/from an imaging device (electronic camera) 44 and a printer 46. Data of an image or the like that is read from the flexible disk 32, the optical disk 36, the recording medium 40, the imaging device 44, and the like can be stored in the HDD 20. As a connecting device to connect with the imaging device 44 and the printer 46, IEEE1394, wired LAN, infrared data communication (IrDA), Bluetooth™, and the like may be included in addition to USB.

A communication interface (communication I/F) 48 communicates with a network NW.

The image processing apparatus 10 of the present embodiment further includes a time information acquisition section 50, a grouping processing section 52, and a group information addition processing section 54.

The time information acquisition section 50 acquires time information which indicates a photographing date/time of image data stored in the hard disk device 18. Such time information of image data is recorded in additional information of a file of the image data (for example, file's header information, Exif tag information) or metadata (for example, xml format) that is different from the file of the image data, and the time information acquisition section 50 acquires time information from the additional information of the image data file or the metadata.

The grouping processing section 52 performs grouping of image data based on the above described time information and the like. Details of grouping processing will be described later.

When image data stored in the hard disk device 18 is backed up to the optical disk 36 or the like, the group information addition processing section 54 performs processing for adding group information which indicates a result of grouping by the grouping processing section 52 to the back up target image data. The group information of image data may be added to additional information of a file of the image data (for example, file's header information, Exif tag information), or may be recorded in metadata (for example, xml format) that is different from the file of the image data.

[Grouping Processing of Image]

Figure 2:
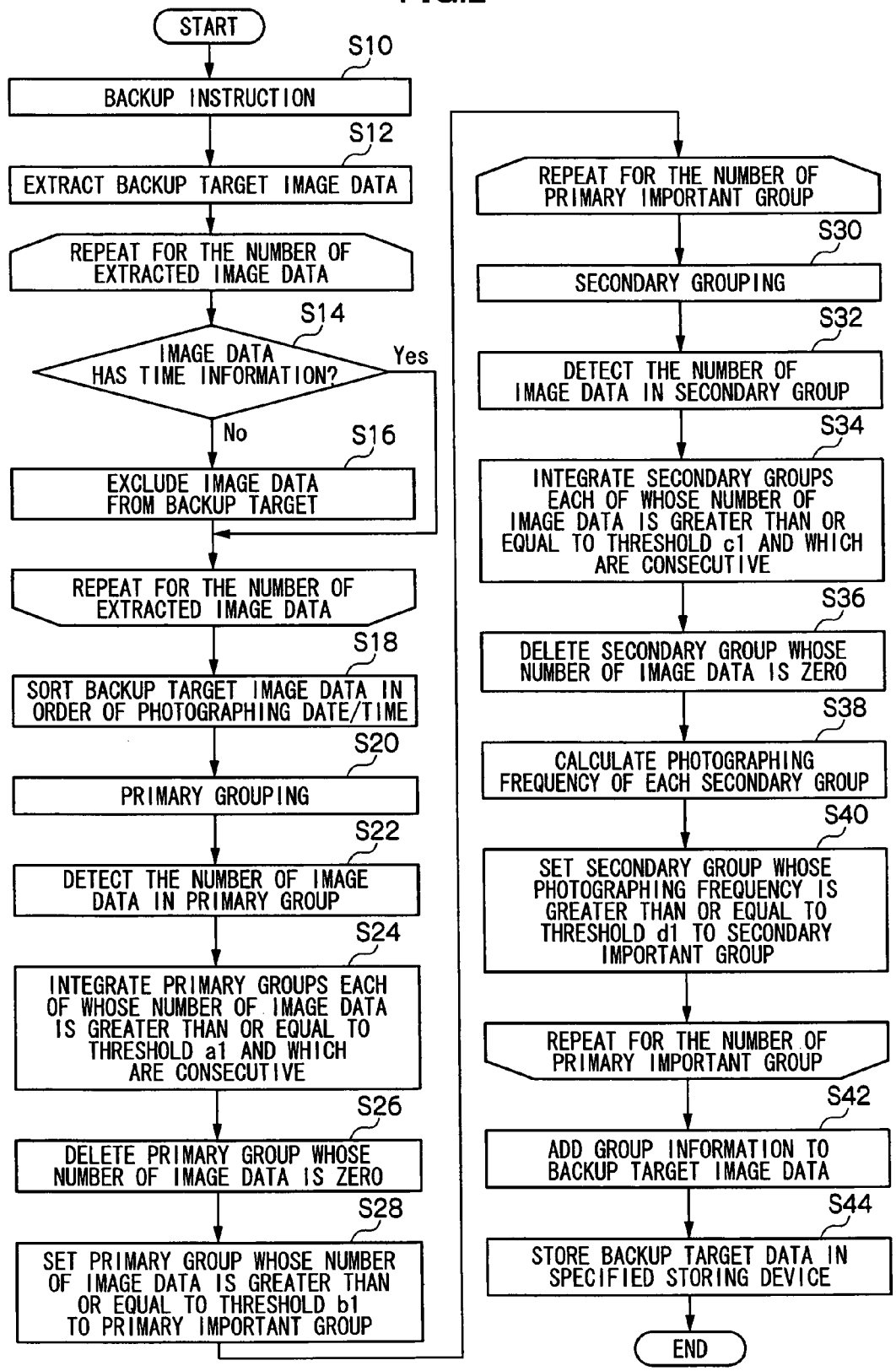
FIG. 2 is a flowchart which shows a flow of grouping processing in an image processing apparatus 10 according to a first embodiment of the present invention.

Next, grouping processing will be described with reference to the flowchart of FIG. 2. First, when an assignment of a storing device (the optical disk 36, the recording medium 40, a external hard disk device, or the like), from the mouse 26 or the like, to which image data is backed up and an input of an instruction to back up the image data are accepted (step S10), the backup target image data is extracted from the hard disk device 18 (step S12).

Then, whether or not each of the image data extracted in step S12 has time information which indicates photographing date/time is determined (step S14). Then, image data having no time information is excluded from targets of backup (step S16).

Then, the backup target image data is sorted in order of photographing date/time (step S18), and primary grouping processing is performed so that the backup target image data is grouped into respective primary grouping units (for example, one day) (step S20). Thus, the backup target image data is grouped into primary groups on the basis of per photographing date.

Then, the number of image data belonging to each primary group is detected (step S22), primary groups each of whose number of image data is greater than or equal to a threshold a1 (for example, a1=10) and whose photographing dates are consecutive are integrated (step S24), and a primary group whose number of image data is zero is deleted (step S26). Thereby, a primary group of image data is established. In step S22, if there is image data which has been edited after photographing and stored as a different file, such image data may be excluded from the count of the number of image data, or may be counted as one image. In step S24, primary groups each of whose number of image data is greater than or equal to the threshold a1 may be integrated with primary groups whose photographing dates are consecutive and each of whose number of image data is equal to or greater than one. Then, a primary group whose number of image data is equal to or greater than threshold b1 (for example, b1=10) from among primary groups established by the processing of the steps S20 to S26 is set to a primary important group (step S28).

Then, secondary processing is performed on image data belonging to primary important groups, so that image data in each primary important group is grouped for each secondary grouping unit (for example, one hour) (step S30). Thus, image data belonging to each primary important group is grouped into secondary groups for each photographing time.

Then, the number of image data belonging to each secondary group is detected (step S32), secondary groups each of whose number of image data is equal to or greater than a threshold c1 (for example, c1=1) and whose photographing dates are consecutive are integrated (step S34), and a secondary group whose number of image data is zero is deleted (step S36). Thereby, a secondary group of image data is established. In step S34, a secondary group whose number of image data is equal to or greater than the threshold c1 may be integrated with primary groups whose photographing times are consecutive and each of whose number of image data is equal to or greater than one. Then, with respect to each secondary group established by the processing of the steps S30 to S36, a photographing frequency which indicates the number of image data photographed per unit time is calculated (step S38), and a secondary group whose photographing frequency is equal to or greater than a threshold d1 (for example, d1=10) is set to a secondary important group (step S40).

Then, group information which indicates a primary group, a primary important group, a secondary group, and a secondary important group to which backup target image data belongs is added to the backup target image data (step S42), and backup target image data is stored in a storing device specified as a backup destination (step S44).

According to the present embodiment, primary groups each of whose number of photographed image data is large and whose photographing dates are consecutive are integrated as a primary important group, so that image data, for example, corresponding to a series of images photographed during event or the like over a few days can be classified into a primary important group automatically, and furthermore, an image in a time zone in which there are a great number of photographed image data from the primary important group is classified into a secondary important group, so that the classified group information can be added to the image data and backed up. By using this group information, important image data can be easily retrieved from among images stored in the storing device of the backup destination.

Although image data having no time information is excluded from targets of backup in the present embodiment, it may be backed up while being excluded from targets of grouping.

Although grouping is performed during backup of image data in the present embodiment, grouping processing may be performed, for example, as needed. In addition, image data stored in the hard disk device 18 may be classified into a folder based on a grouping result.

Second Embodiment

Next, a second embodiment of the present invention will be described. A configuration of an image processing apparatus according to the present embodiment is similar to that of the first embodiment. Components of the present embodiment that are similar to those of the first embodiment are indicated by identical reference numerals and description thereof will be omitted.

Figure 3:
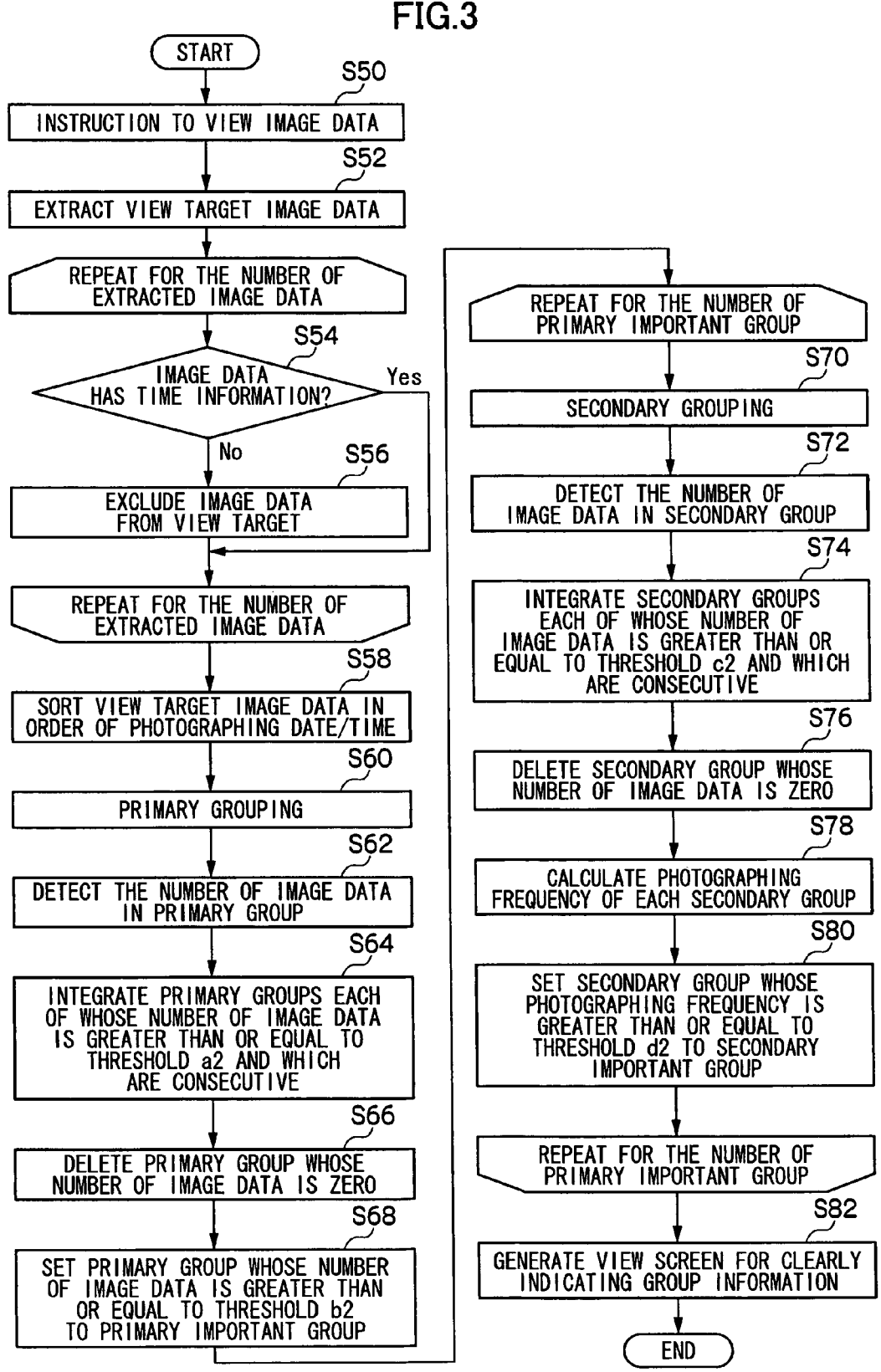
FIG. 3 is a flowchart which shows a flow of grouping processing in an image processing apparatus 10 according to a second embodiment of the present invention.

FIG. 3 is a flowchart which shows a flow of grouping processing in an image processing apparatus 10 according to the second embodiment of the present invention. First, when an input of an instruction to view image data stored in a storing device (an optical disk 36, a recording medium 40, an external hard disk device, or the like) of a backed up destination is accepted from a mouse 26 or the like (step S50), view target image data is extracted from the storing device (step S52).

Then, whether or not each of the image data extracted in step S52 has time information which indicates photographing date/time is determined (step S54). Then, image data having no time information is excluded from targets of view (step S56).

Then, the view target image data is sorted in order of photographing date/time (step S58), and primary grouping processing is performed so that the view target image data is grouped into respective primary grouping units (for example, one day) (step S60). Thus, the view target image data is grouped into primary groups on the basis of per photographing date.

Then, the number of image data belonging to each primary group is detected (step S62), primary groups each of whose number of image data is equal to or greater than a threshold a2 (for example, a2=10) and whose photographing dates are consecutive are integrated (step S64), and a primary group whose number of image data is zero is deleted (step S66). Thereby, a primary group of image data is established. In step S62, if there is image data which has been edited after photographing and stored as a different file, such image data may be excluded from the count of the number of image data, or may be counted as one image. In step S64, a primary group whose number of image data is equal to or greater than the threshold a2 may be integrated with primary groups whose photographing dates are consecutive and each of whose number of image data is equal to or greater than one. Then, a primary group whose number of image data is equal to or greater than a threshold b2 (for example, b2=10) from among primary groups established by the processing of the steps S60 to S66 is set to a primary important group (step S68).

Then, secondary grouping processing is performed on image data belonging to primary important groups, so that image data in each primary important group is grouped for each secondary grouping unit (for example, one hour) (step S70). Thus, image data belonging to each primary important group is grouped into secondary groups for each photographing time.

Then, the number of image data belonging to each secondary group is detected (step S72), secondary groups each of whose number of image data is equal to or greater than a threshold c2 (for example, c2=1) and whose photographing dates are consecutive are integrated (step S74), and a secondary group whose number of image data is zero is deleted (step S76). Thereby, a secondary group of image data is established. In step S74, a secondary group whose number of image data is equal to or greater than the threshold c2 may be integrated with primary groups whose photographing times are consecutive and each of whose number of image data is equal to or greater than one. Then, with respect to each secondary group established by the processing of the steps S70 to S76, a photographing frequency which indicates the number of image data photographed per unit time is calculated (step S78), and a secondary group whose photographing frequency is equal to or greater than a threshold d2 (for example, d2=10) is set to a secondary important group (step S80).

Then, the above described group information is primarily recorded in a RAM 18, a view screen for viewing view target image data is displayed on a display device 24, and group information which indicates a primary group, a primary important group, a secondary group, and a secondary important group to which each view target image data belongs is clearly indicated on the view screen (step S82). As a method used for clearly indicating group information, for example, there is a method which use a different color for each group with respect to a color of a frame and/or file name characters added to image data in a view screen (for example, a blue frame is added to image data belonging to a primary important group, and a red frame is added to image data belonging to a secondary important group), a method which use a different image display size for each group (for example, image data belonging to a primary important group is larger in size than image data belonging to neither a primary important group nor a secondary important group, and image data belonging to a secondary important group is larger in size than image data belonging to a primary important group), or a combination of frame color, character color, and display size by which group information is clearly indicated. In addition, by adding group information to image data, grouping processing on the image data having the group information added may be omitted next time the image data is viewed.

According to the present embodiment, primary groups each of whose number of photographed image data is large and whose photographing dates are consecutive are integrated as a primary important group, so that image data, for example, corresponding to a series of images photographed during event or the like over a few days can be classified into a primary important group automatically, and furthermore, an image in a time zone in which there are a great number of photographed image data from the primary important group is classified into a secondary important group, so that group information into each image data is classified can be clearly indicated. Thereby, image data of a certain event or in a time zone in which there are a great number of photographed image data can be easily retrieved in a view screen.

Although image data having no time information is excluded from targets of view in the present embodiment, it may be displayed on a view screen while being excluded from targets of grouping. In addition, image data excluded from targets of grouping may be displayed in a way that the excluded image data can be distinguished from grouping target image data (for example, by frame color, color of file name characters, display size, or combination thereof).

Third Embodiment

A third embodiment of the present invention will next be described. Components of the present embodiment that are similar to those of the foregoing embodiments are indicated by identical reference numerals and description thereof will be omitted.

Figure 4:
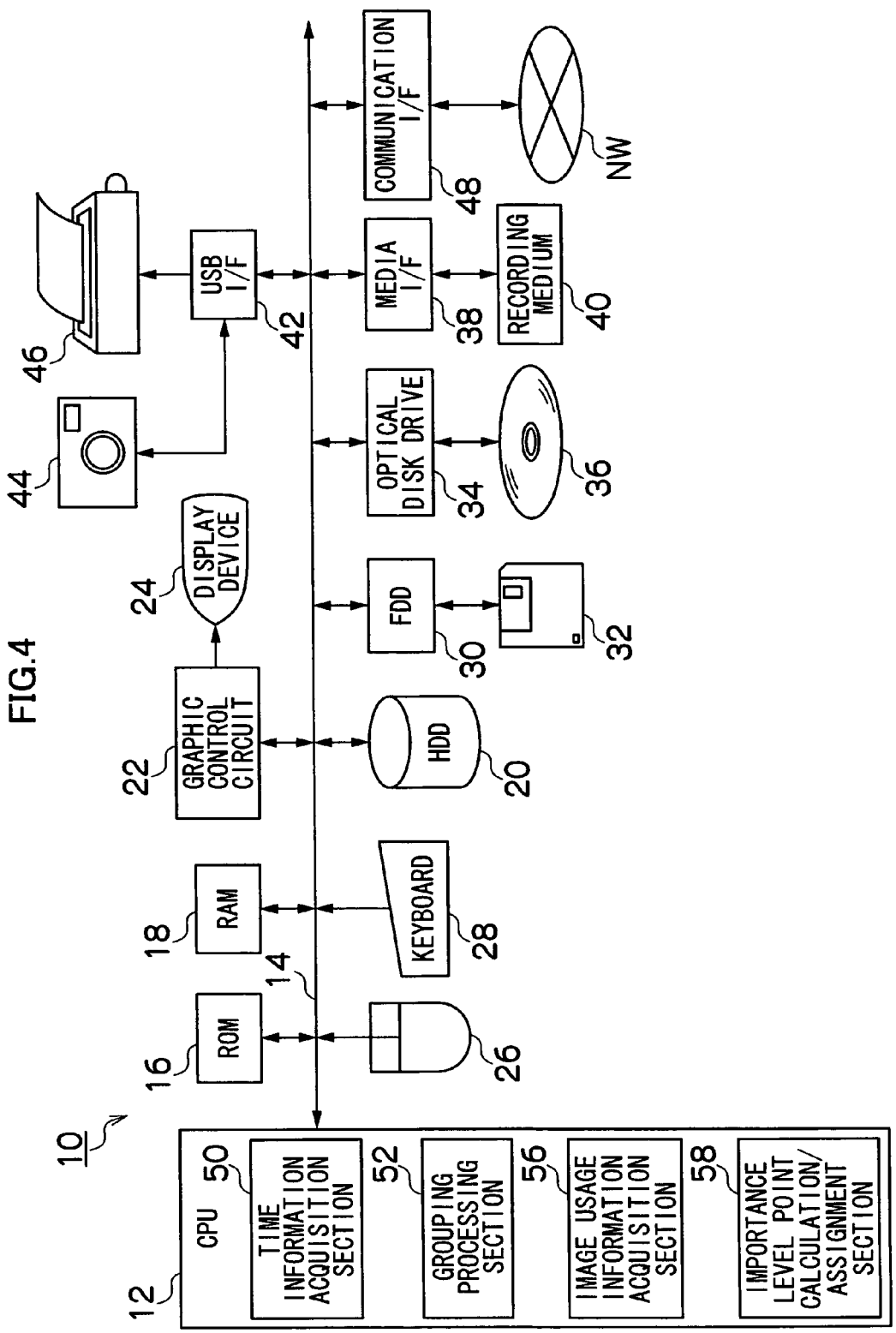
FIG. 4 is a block diagram which shows main components of an image processing apparatus according to a third embodiment of the present invention.

FIG. 4 is a block diagram which shows main components of an image processing apparatus according to the third embodiment of the present invention. An image processing apparatus 10 of the present embodiment includes an image usage information acquisition section 56 and an importance level point calculation/assignment section 58.

The image usage information acquisition section 56 counts the number of times of full-screen display and the number of times of copying about image data stored in a hard disk device 18, and records such count information as usage information of the relevant image data. As used herein, the number of times of full-screen display is the number of times of full-screen display of image data displayed on a display device 24 after the image data is stored in the hard disk device 18. The number of times of copying is the number of copy data of image data stored in the hard disk device 18. The number of times of copying may be, for example, the number of times of copying into a storing device such as a flexible disk 32, an optical disk 36, or a recording medium 40, the number of times of copying into software for diary or a webpage, the number of times of sending a copy of relevant image data in e-mail, or a sum of those numbers. The number of times of full-screen display and the number of times of copying of image data are recorded by the image usage information acquisition section 56 into, for example, additional information of a file of the image data (for example, file's header information, Exif tag information) or metadata (for example, xml format) that is different from the file of the image data.

The importance level point calculation/assignment section 58 calculates importance level points of respective backup target image data based on time information and usage information. Such assignment of an importance level point is performed by writing importance level point information into, for example, additional information of a file of the image data (for example, file's header information, Exif tag information) or metadata (for example, xml format) that is different from the file of the image data. The calculation method of importance level points will be described later.

Figure 5:
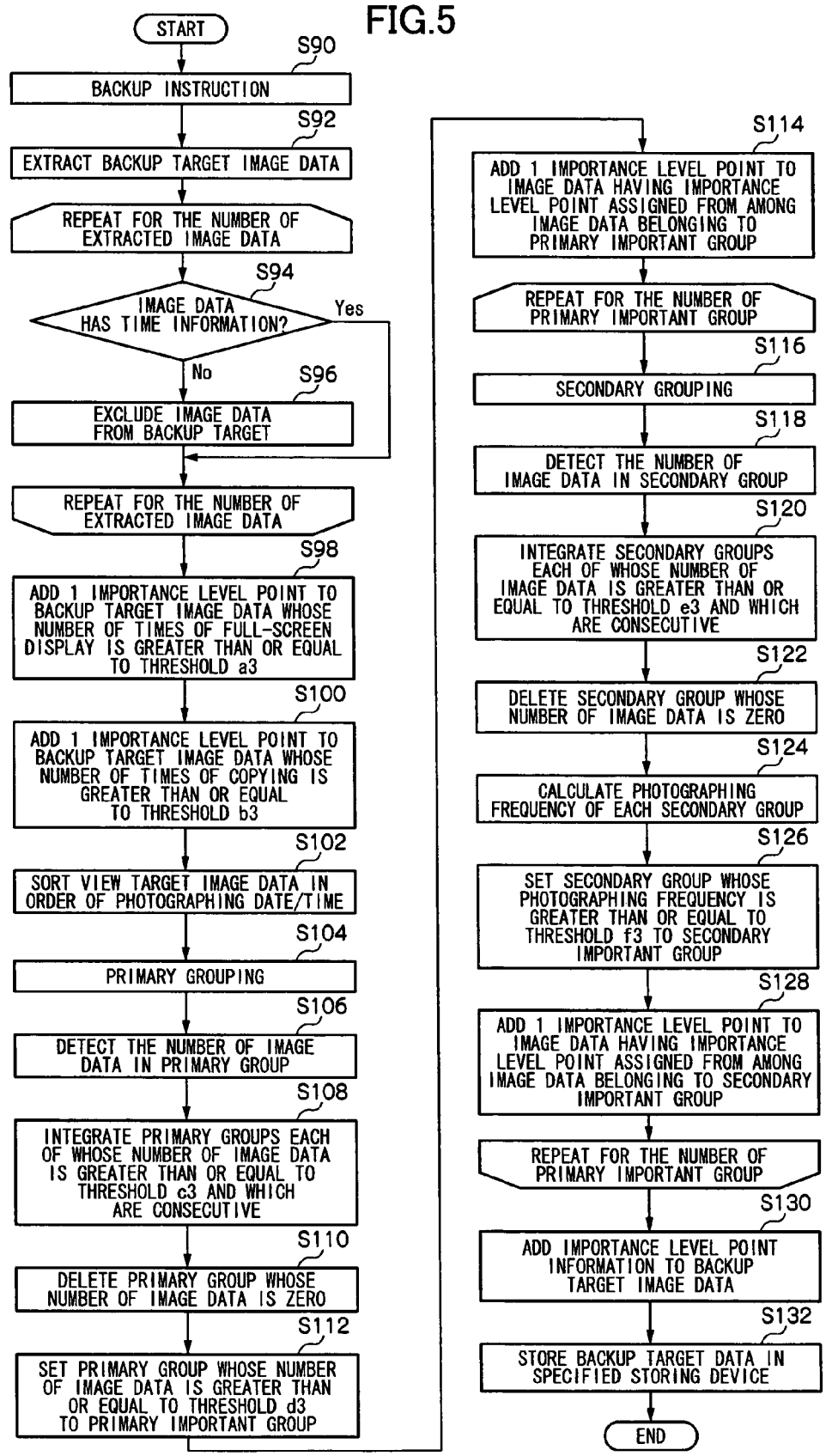
FIG. 5 is a flowchart which shows a flow of grouping processing in an image processing apparatus 10 according to the third embodiment of the present invention.

FIG. 5 is a flowchart which shows a flow of grouping processing in the image processing apparatus 10 according to the third embodiment of the present invention. First, when an assignment with a mouse 26 or the like of a storing device to which image data is backed up (an optical disk 36, a recording medium 40, an external hard disk device, or the like) and an input of an instruction to back up the image data are accepted (step S90), the backup target image data is extracted from the hard disk device 18 (step S92).

Then, whether or not each of the image data extracted in step S 92 has time information which indicates photographing date/time is determined (step S94). Then, image data having no time information is excluded from targets of backup (step S96).

Then, 1 importance level point is added to an image whose number of full-screen display is greater than or equal to a threshold a3 (for example, a3=5) from among the backup target image data (step S98). Further, 1 importance level point is added to an image whose number of copying is greater than or equal to a threshold b3 (for example, b3=2) from among the backup target image data (step S100).

Then, the backup target image data is sorted in order of photographing date/time (step S102), and primary grouping processing is performed so that the backup target image data is grouped into respective primary grouping units (for example, one day) (step S104). Thus, the backup target image data is grouped into primary groups on the basis of per photographing date.

Then, the number of image data belonging to each primary group is detected (step S1106), primary groups each of whose number of image data is greater than or equal to a threshold c3 (for example, c3=10) and whose photographing dates are consecutive are integrated (step S108), and a primary group whose number of image data is zero is deleted (step S110). Thereby, a primary group of image data is defined. In step S106, if there is image data which has been edited after photographing and stored as a different file, such image data may be excluded from the count of the number of image data, or may be counted as one image. In step S108, primary groups each of whose number of image data is greater than or equal to the threshold a3 may be integrated with primary groups whose photographing dates are consecutive and each of whose number of image data is greater than or equal to one. Then, a primary group whose number of image data is greater than or equal to a threshold d3 (for example, d3=10) from among primary groups defined by the processing of the steps S104 to S110 is set to a primary important group (step S112), and then 1 importance level point is added to image data having an importance level point assigned from among the backup target image data belonging to the primary important group (step S114).

Then, secondary grouping processing is performed on image data belonging to primary important groups, so that image data in each primary important group is grouped for each secondary grouping unit (for example, one hour) (step S116). Thus, image data belonging to each primary important group is grouped into secondary groups for each photographing time.

Then, the number of image data belonging to each secondary group is detected (step S118), secondary groups each of whose number of image data is greater than or equal to a threshold e3 (for example, e3=1) and whose photographing times are consecutive are integrated (step S120), and a secondary group whose number of image data is zero is deleted (step S122). Thereby, a secondary group of image data is defined. In step S120, a secondary group whose number of image data is greater than or equal to the threshold e3 may be integrated with primary groups whose photographing times are consecutive and each of whose number of image data is greater than or equal to one. Then, with respect to each secondary group defined by the processing of the steps S116 to S122, a photographing frequency which indicates the number of image data photographed per unit time is calculated (step S124), and a secondary group whose photographing frequency is greater than or equal to a threshold f3 (for example, f3=0) is set to a secondary important group (step S126), and then 1 importance level point is added to image data having an importance level point assigned from among the backup target image data belonging to the secondary important group (step S128).

Then, importance level point information is added to the backup target image data (step S130), and the backup target image data is stored in a storing device specified as a backup destination (step S132).

According to the present embodiment, since image data can be grouped and an importance level point can be assigned to the image data based on time information and usage information when an image is backed up, important image data can be easily retrieved from among images stored in a storing device of a backup destination by using the importance level point information.

Although image data having no time information is excluded from targets of backup in the present embodiment, it may be backed up while being excluded from targets of grouping.

Although grouping is performed during backup of image data in the present embodiment, grouping processing may be performed, for example, as needed. In addition, image data stored in the hard disk device 18 may be classified into a folder based on a grouping result.

Fourth Embodiment

Next, a fourth embodiment of the present invention will be described. A configuration of an image processing apparatus according to the present embodiment is similar to that of the third embodiment. Components of the present embodiment that are similar to those of the foregoing embodiments are indicated by identical reference numerals and description thereof will be omitted.

Figure 6:
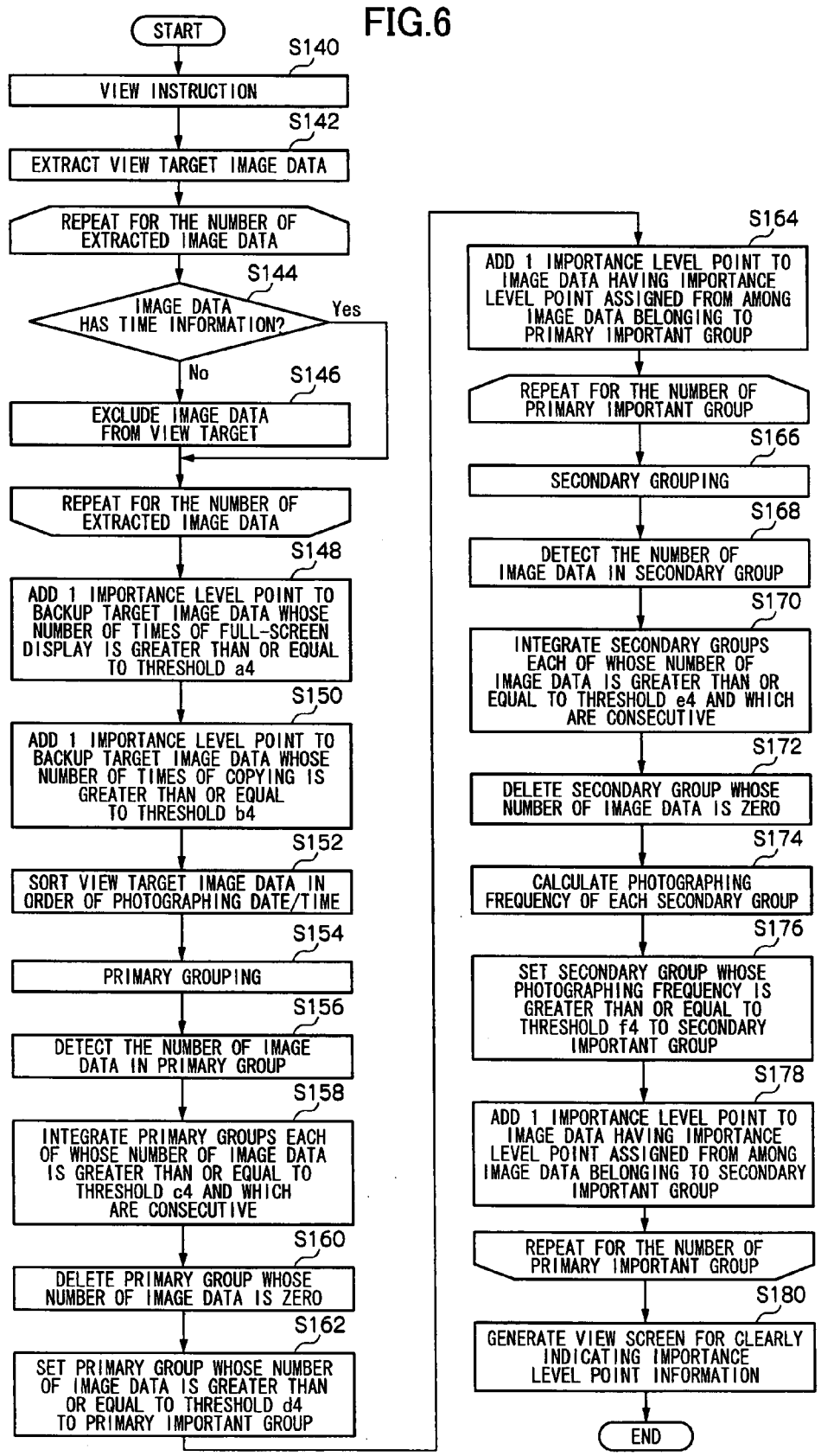
FIG. 6 is a flowchart which shows a flow of grouping processing in an image processing apparatus 10 according to a fourth embodiment of the present invention.

FIG. 6 is a flowchart which shows a flow of grouping processing in an image processing apparatus 10 according to the fourth embodiment of the present invention. First, when an input of an instruction to view image data stored in a storing device (an optical disk 36, a recording medium 40, an external hard disk device, or the like) of a backup destination is accepted with a mouse 26 or the like (step S140), view target image data is extracted from the storing device (step S142).

Then, whether or not each of the image data extracted in step S142 has time information which indicates photographing date/time is determined (step S144). Then, image data having no time information is excluded from targets of view (step S146).

Then, 1 importance level point is added to an image whose number of full-screen display is greater than or equal to a threshold a4 (for example, a4=5) from among the view target image data (step S148). Further, 1 importance level point is added to an image whose number of copying is greater than or equal to a threshold b4 (for example, b4=2) from among the view target image data (step S150).

Then, the view target image data is sorted in order of photographing date/time (step S152), and primary grouping processing is performed so that the backup target image data is grouped into respective primary grouping units (for example, one day) (step S154). Thus, the backup target image data is grouped into primary groups on the basis of per photographing date.

Then, the number of image data belonging to each primary group is detected (step S156), primary groups each of whose number of image data is greater than or equal to a threshold c4 (for example, c4=10) and whose photographing dates are consecutive are integrated (step S158), and a primary group whose number of image data is zero is deleted (step S160). Thereby, a primary group of image data is defined. In step S156, if there is image data which has been edited after photographing and stored as a different file, such image data may be excluded from the count of the number of image data, or may be counted as one image. In step S158, primary groups each of whose number of image data is greater than or equal to the threshold c4 may be integrated with primary groups whose photographing dates are consecutive and each of whose number of image data is greater than or equal to one.

Then, a primary group whose number of image data is greater than or equal to a threshold d4 (for example, d4=10) from among primary groups defined by the processing of the steps S1154 to S160 is set to a primary important group (step S162), and then 1 importance level point is added to image data having an importance level point assigned from among the backup target image data belonging to the primary important group (step S164).

Then, secondary grouping processing is performed on image data belonging to primary important groups, so that image data in each primary important group is grouped for each secondary grouping unit (for example, one hour) (step S166). Thus, image data belonging to each primary important group is grouped into secondary groups for each photographing time.

Then, the number of image data belonging to each secondary group is detected (step S168), secondary groups each of whose number of image data is greater than or equal to a threshold e4 (for example, e4=1) and whose photographing times are consecutive are integrated (step S170), and a secondary group whose number of image data is zero is deleted (step S172). Thereby, a secondary group of image data is defined. In step S170 a secondary group whose number of image data is greater than or equal to the threshold e4 may be integrated with primary groups whose photographing times are consecutive and each of whose number of image data is greater than or equal to one. Then, with respect to each secondary group defined by the processing of the steps S166 to S172, a photographing frequency which indicates the number of image data photographed per unit time is calculated (step S174), and a secondary group whose photographing frequency is greater than or equal to a threshold f4 (for example, f4=10) is set to a secondary important group (step S176), and then 1 importance level point is added to image data having an importance level point assigned from among the backup target image data belonging to the secondary important group (step S178).

Then, the above described group information is primarily recorded in a RAM 18, a view screen for viewing view target image data is displayed on a display device 24, and importance level point information of each view target image data is clearly indicated on the view screen (step S180). As a method used for clearly indicating importance level point information, for example, there is a method which displays a value of importance level point along with image data, a method which use a different color for each group with respect to a color of a frame and/or file name characters added to image data in a view screen (for example, a blue frame is added to image data which has 1 or more importance level points, and a red frame is added to image data which has 3 or more importance level points), a method which use a different image display size depending on importance level points, (for example, as a level point value is larger, image data is displayed larger in size), or a combination of frame color, character color, and display size by which group information is clearly indicated. In addition, by adding importance level point information to image data, grouping processing on the image data having the importance level point information added may be omitted next time the image data is viewed.

According to the present embodiment, since image data can be grouped and an importance level point can be assigned to the image data based on time information and usage information when an image is viewed, important image data can be easily retrieved from among images stored in a storing device of a backup destination by using the importance level point information.

Although image data having no time information is excluded from targets of view in the present embodiment, it may be displayed on a view screen while being excluded from targets of grouping. In addition, image data excluded from targets of grouping may be displayed in a way that the excluded image data can be distinguished from grouping target image data (for example, by frame color, color of file name characters, display size, or combination thereof).

Although, in the first to fourth embodiments described above, image data is grouped twice by two grouping units, i.e., a primary grouping unit and a secondary grouping unit whose period is shorter than the primary grouping unit, grouping may be performed only once so that a photographing frequency is calculated with respect to an image group generated by one-time grouping.

What is claimed is:

1. An image processing apparatus, comprising:
   an image storing device which stores image data;
   a grouping device which groups the image data into groups on basis of photographing time unit based on time information that indicates date/time at which the image data is photographed, and, if there are groups each of whose number of image data is greater than or equal to a first threshold and whose photographing times are consecutive, generates a group which integrates the consecutive groups;
   a photographing frequency calculating device which calculates a photographing frequency that indicates the number of photographed images per unit time of image data belonging to the group generated by the grouping;
   an important group setting device which sets the group whose photographing frequency is greater than or equal to a second threshold to an important group; and
   a group information recording device which records information of the group to which the image data belongs.

2. The image processing apparatus according to claim 1, wherein the group information recording device records the group information in additional information of the image data or metadata different from the image data.

3. The image processing apparatus according to claim 2, further comprising:
   a backup device which backs up the image data stored in the image storing device to another storing device; and
   a backup instruction device which gives an instruction to execute the backup,
   wherein the group information recording device records the group information if the instruction to execute the backup is given.

4. The image processing apparatus according to claim 2, further comprising:
   a view instruction device which gives an instruction to view image data stored in the image storing device; and
   an image displaying device which displays the image data so as to clearly indicate the group information if the instruction to view the image data is given.

5. The image processing apparatus according to claim 1, further comprising:
   a backup device which backs up the image data stored in the image storing device to another storing device; and
   a backup instruction device which gives an instruction to execute the backup,
   wherein the group information recording device records the group information if the instruction to execute the backup is given.

6. The image processing apparatus according to claim 1, further comprising:

a view instruction device which gives an instruction to view image data stored in the image storing device; and an image displaying device which displays the image data so as to clearly indicate the group information if the instruction to view the image data is given.

7. An image processing apparatus, comprising:

an image storing device which stores image data;

a primary grouping device which groups the image data into a primary groups on basis of a first photographing time unit and, if there are primary groups each of whose number of the image data is greater than or equal to a first threshold and whose photographing times are consecutive, generates a primary group which integrates the consecutive primary groups;

a primary important group setting device which sets the primary group whose number of image data is greater than or equal to a second threshold to a primary important group;

a secondary grouping device which groups an image belonging to the primary important group into a secondary groups on basis of a second photographing time unit that is shorter than the first photographing time unit, and, if there are secondary groups each of whose number of the image data is greater than or equal to a third threshold and whose photographing times are consecutive, generates a secondary group which integrates the consecutive secondary groups;

a photographing frequency calculating device which calculates a photographing frequency that indicates the number of photographed images per unit time of image data belonging to the secondary group generated by the grouping;

a secondary important group setting device which sets the secondary group whose photographing frequency is greater than or equal to a fourth threshold to a secondary important group; and a group information recording device which records information of the group to which the image data belongs.

8. The image processing apparatus according to claim 7, wherein the group information recording device records the group information in additional information of the image data or metadata different from the image data.

9. The image processing apparatus according to claim 8, further comprising:

a backup device which backs up the image data stored in the image storing device to another storing device; and a backup instruction device which gives an instruction to execute the backup, wherein the group information recording device records the group information if the instruction to execute the backup is given.

10. The image processing apparatus according to claim 8, further comprising:

a view instruction device which gives an instruction to view image data stored in the image storing device; and an image displaying device which displays the image data so as to clearly indicate the group information if the instruction to view the image data is given.

11. The image processing apparatus according to claim 7, further comprising:

a backup device which backs up the image data stored in the image storing device to another storing device; and a backup instruction device which gives an instruction to execute the backup, wherein the group information recording device records the group information if the instruction to execute the backup is given.

12. The image processing apparatus according to claim 7, further comprising:

a view instruction device which gives an instruction to view image data stored in the image storing device; and an image displaying device which displays the image data so as to clearly indicate the group information if the instruction to view the image data is given.

13. An image processing apparatus, comprising:

an image storing device which stores image data;

a usage information acquiring device which acquires usage information that indicates usage status of the image;

a grouping device which groups the image data into groups on basis of photographing time unit based on time information that indicates date/time at which the image data is photographed, and, if there are groups each of whose number of image data is greater than or equal to a first threshold and whose photographing times are consecutive, generates a group that integrates the consecutive groups;

a photographing frequency calculating device which calculates a photographing frequency that indicates the number of photographed images per unit time of image data belonging to the group generated by the grouping;

an important group setting device which sets the group whose photographing frequency is greater than or equal to a second threshold to an important group;

a point assignment device which assigns an importance level point to the image data based on the usage information and the group to which the image data belongs; and an importance level point information recording device which records importance level point information assigned to the image data.

14. The image processing apparatus according to claim 13, wherein the usage information acquiring device acquires information of at least one of the number of times of viewing, the number of times of full-screen display, and the number of times of copying with respect to the image data.

15. The image processing apparatus according to claim 14, wherein the importance level point recording device records the importance level point information in additional information of the image data or metadata different from the image data.

16. The image processing apparatus according to claim 15, further comprising:

a backup device which backs up the image data stored in the image storing device to another storing device; and a backup instruction device which gives an instruction to execute the backup, wherein the importance level point recording device records the importance level point if the instruction to execute the backup is given.

17. The image processing apparatus according to claim 15, further comprising:

a view instruction device which gives an instruction to view image data stored in the image storing device; and an image displaying device which displays the image data so as to clearly indicate the importance level point information if the instruction to view the image data is given.

18. The image processing apparatus according to claim 13, wherein the importance level point recording device records the importance level point information in additional information of the image data or metadata different from the image data.

19. The image processing apparatus according to claim 13, further comprising:

a backup device which backs up the image data stored in the image storing device to another storing device; and a backup instruction device which gives an instruction to execute the backup, wherein the importance level point recording device records the importance level point if the instruction to execute the backup is given.

20. The image processing apparatus according to claim 13, further comprising:

a view instruction device which gives an instruction to view image data stored in the image storing device; and an image displaying device which displays the image data so as to clearly indicate the importance level point information if the instruction to view the image data is given.

21. An image processing apparatus, comprising:

an image storing device which stores image data;

a usage information acquiring device which acquires usage information that indicates usage status of the image;

a primary grouping device which groups the image data into a primary groups on basis of a first photographing time unit and, if there are primary groups each of whose number of the image data is greater than or equal to a first threshold and whose photographing times are consecutive, generates a primary group which integrates the consecutive primary groups;

a primary important group setting device which sets the primary group whose number of image data is greater than or equal to a second threshold to a primary important group;

a secondary grouping device which groups an image belonging to the primary important group into a secondary groups on basis of a second photographing time unit that is shorter than the first photographing time unit, and, if there are secondary groups each of whose number of the image data is greater than or equal to a third threshold and whose photographing times are consecutive, generates a secondary group which integrates the consecutive secondary groups;

a photographing frequency calculating device which calculates a photographing frequency that indicates the number of photographed images per unit time of image data belonging to the secondary group generated by the grouping;

a secondary important group setting device which sets the secondary group whose photographing frequency is greater than or equal to a fourth threshold to a secondary important group;

a point assignment device which assigns an importance level point to the image data based on the usage information and the group to which the image data belongs; and an importance level point information recording device which records importance level point information assigned to the image data.

22. The image processing apparatus according to claim 21, wherein the usage information acquiring device acquires information of at least one of the number of times of viewing, the number of times of full-screen display, and the number of times of copying with respect to the image data.

23. The image processing apparatus according to claim 22, wherein the importance level point recording device records the importance level point information in additional information of the image data or metadata different from the image data.

24. The image processing apparatus according to claim 23, further comprising:

a backup device which backs up the image data stored in the image storing device to another storing device; and a backup instruction device which gives an instruction to execute the backup, wherein the importance level point recording device records the importance level point if the instruction to execute the backup is given.

25. The image processing apparatus according to claim 23, further comprising:

a view instruction device which gives an instruction to view image data stored in the image storing device; and an image displaying device which displays the image data so as to clearly indicate the importance level point information if the instruction to view the image data is given.

26. The image processing apparatus according to claim 21, wherein the importance level point recording device records the importance level point information in additional information of the image data or metadata different from the image data.

27. The image processing apparatus according to claim 21, further comprising:

a backup device which backs up the image data stored in the image storing device to another storing device; and a backup instruction device which gives an instruction to execute the backup, wherein the importance level point recording device records the importance level point if the instruction to execute the backup is given.

28. The image processing apparatus according to claim 21, further comprising:

a view instruction device which gives an instruction to view image data stored in the image storing device; and an image displaying device which displays the image data so as to clearly indicate the importance level point information if the instruction to view the image data is given.

29. A computer readable medium storing an image processing program which causes a computer to implement:

an image storing function which stores image data;

a grouping function which groups the image data into groups on basis of photographing time unit based on time information that indicates date/time at which the image data is photographed, and, if there are groups each of whose number of image data is greater than or equal to a first threshold and whose photographing times are consecutive, generates a group which integrates the consecutive groups;

a photographing frequency calculating function which calculates a photographing frequency that indicates the number of photographed images per unit time of image data belonging to the group generated by the grouping;

an important group setting function which sets the group whose photographing frequency is greater than or equal to a second threshold to an important group; and a group information recording function which records information of the group to which the image data belongs.

30. The computer readable medium storing the image processing program according to claim 29, wherein the group information recording function records the group information in additional information of the image data or metadata different from the image data.

31. The computer readable medium storing the image processing program according to claim 30, causing the computer to further implement:

a backup function which backs up the image data stored with the image storing function to another storing function;

a backup instruction function which gives an instruction to execute the backup; and a function which records the group information by the group information recording function if the instruction to execute the backup is given.

32. The computer readable medium storing the image processing program according to claim 30, causing the computer to further implement:

a view instruction function which gives an instruction to view image data stored with the image storing function; and an image displaying function which displays the image data so as to clearly indicate the group information if the instruction to view the image data is given.

33. The computer readable medium storing the image processing program according to claim 29, causing the computer to further implement:

a backup function which backs up the image data stored with the image storing function to another storing function;

a backup instruction function which gives an instruction to execute the backup; and a function which records the group information by the group information recording function if the instruction to execute the backup is given.

34. The computer readable medium storing the image processing program according to claim 29, causing the computer to further implement:

a view instruction function which gives an instruction to view image data stored with the image storing function; and an image displaying function which displays the image data so as to clearly indicate the group information if the instruction to view the image data is given.

35. A computer readable medium storing an image processing program which causes a computer to implement:

an image storing function which stores image data;

a primary grouping function which groups the image data into a primary groups on basis of a first photographing time unit and, if there are primary groups each of whose number of the image data is greater than or equal to a first threshold and whose photographing times are consecutive, generates a primary group which integrates the consecutive primary groups;

a primary important group setting function which sets the primary group whose number of image data is greater than or equal to a second threshold to a primary important group;

a secondary grouping function which groups an image belonging to the primary important group into a secondary groups on basis of a second photographing time unit that is shorter than the first photographing time unit, and, if there are secondary groups each of whose number of the image data is greater than or equal to a third threshold and whose photographing times are consecutive, generates a secondary group which integrates the consecutive secondary groups;

a photographing frequency calculating function which calculates a photographing frequency that indicates the number of photographed images per unit time of image data belonging to the secondary group generated by the grouping;

a secondary important group setting function which sets the secondary group whose photographing frequency is greater than or equal to a fourth threshold to a secondary important group; and a group information recording function which records information of the group to which the image data belongs.

36. The computer readable medium storing the image processing program according to claim 35, wherein the group information recording function records the group information in additional information of the image data or metadata different from the image data.

37. The computer readable medium storing the image processing program according to claim 36, causing the computer to further implement:

a backup function which backs up the image data stored with the image storing function to another storing function;

a backup instruction function which gives an instruction to execute the backup; and a function which records the group information by the group information recording function if the instruction to execute the backup is given.

38. The computer readable medium storing the image processing program according to claim 36, causing the computer to further implement:

a view instruction function which gives an instruction to view image data stored with the image storing function; and an image displaying function which displays the image data so as to clearly indicate the group information if the instruction to view the image data is given.

39. The computer readable medium storing the image processing program according to claim 35, causing the computer to further implement:

a backup function which backs up the image data stored with the image storing function to another storing function;

a backup instruction function which gives an instruction to execute the backup; and a function which records the group information by the group information recording function if the instruction to execute the backup is given.

40. The computer readable medium storing the image processing program according to claim 35, causing the computer to further implement:

a view instruction function which gives an instruction to view image data stored with the image storing function; and an image displaying function which displays the image data so as to clearly indicate the group information if the instruction to view the image data is given.

41. A computer readable medium storing an image processing program which causes a computer to implement:

an image storing function which stores image data;

a usage information acquiring function which acquires usage information that indicates usage status of the image;

a grouping function which groups the image data into groups on basis of photographing time unit based on time information that indicates date/time at which the image data is photographed, and, if there are groups each of whose number of image data is greater than or equal to a first threshold and whose photographing times are consecutive, generates a group that integrates the consecutive groups;

a photographing frequency calculating function which calculates a photographing frequency that indicates the number of photographed images per unit time of image data belonging to the group generated by the grouping;

an important group setting function which sets the group whose photographing frequency is greater than or equal to a second threshold to an important group;

a point assignment function which assigns an importance level point to the image data based on the usage information and the group to which the image data belongs; and an importance level point information recording function which records importance level point information assigned to the image data.

42. The computer readable medium storing the image processing program according to claim 41, wherein the usage information acquiring function acquires information of at least one of the number of times of viewing, the number of times of full-screen display, and the number of times of copying with respect to the image data.

43. The computer readable medium storing the image processing program according to claim 42, wherein the importance level point recording function records the importance level point information in additional information of the image data or metadata different from the image data.

44. The computer readable medium storing the image processing program according to claim 43, causing the computer to further implement:

a backup function which backs up the image data stored with the image storing function to another storing function;

a backup instruction function which gives an instruction to execute the backup; and a function which records the importance level point if the instruction to execute the backup is given.

45. The computer readable medium storing the image processing program according to claim 43, causing the computer to further implement:

a view instruction function which gives an instruction to view image data stored with the image storing function; and an image displaying function which displays the image data so as to clearly indicate the importance level point information if the instruction to view the image data is given.

46. The computer readable medium storing the image processing program according to claim 41, wherein the importance level point recording function records the importance level point information in additional information of the image data or metadata different from the image data.

47. The computer readable medium storing the image processing program according to claim 41, causing the computer to further implement:

a backup function which backs up the image data stored with the image storing function to another storing function;

a backup instruction function which gives an instruction to execute the backup; and a function which records the importance level point if the instruction to execute the backup is given.

48. The computer readable medium storing the image processing program according to claim 41, causing the computer to further implement:

a view instruction function which gives an instruction to view image data stored with the image storing function; and an image displaying function which displays the image data so as to clearly indicate the importance level point information if the instruction to view the image data is given.

49. A computer readable medium storing an image processing program which causes a computer to implement:

an image storing function which stores image data;

a usage information acquiring function which acquires usage information that indicates usage status of the image;

a primary grouping function which groups the image data into a primary groups on basis of a first photographing time unit and, if there are primary groups each of whose number of the image data is greater than or equal to a first threshold and whose photographing times are consecutive, generates a primary group which integrates the consecutive primary groups;

a primary important group setting function which sets the primary group whose number of image data is greater than or equal to a second threshold to a primary important group;

a secondary grouping function which groups an image belonging to the primary important group into a secondary groups on basis of a second photographing time unit that is shorter than the first photographing time unit, and, if there are secondary groups each of whose number of the image data is greater than or equal to a third threshold and whose photographing times are consecutive, generates a secondary group which integrates the consecutive secondary groups;

a photographing frequency calculating function which calculates a photographing frequency that indicates the number of photographed images per unit time of image data belonging to the secondary group generated by the grouping;

a secondary important group setting function which sets the secondary group whose photographing frequency is greater than or equal to a fourth threshold to a secondary important group;

a point assignment function which assigns an importance level point to the image data based on the usage information and the group to which the image data belongs; and an importance level point information recording function which records importance level point information assigned to the image data.

50. The computer readable medium storing the image processing program according to claim 49, wherein the usage information acquiring function acquires information of at least one of the number of times of viewing, the number of times of full-screen display, and the number of times of copying with respect to the image data.

51. The computer readable medium storing the image processing program according to claim 50, wherein the importance level point recording function records the importance level point information in additional information of the image data or metadata different from the image data.

52. The computer readable medium storing the image processing program according to claim 51, causing the computer to further implement:

a backup function which backs up the image data stored with the image storing function to another storing function;

a backup instruction function which gives an instruction to execute the backup; and a function which records the importance level point if the instruction to execute the backup is given.

53. The computer readable medium storing the image processing program according to claim 51, causing the computer to further implement:

a view instruction function which gives an instruction to view image data stored with the image storing function; and an image displaying function which displays the image data so as to clearly indicate the importance level point information if the instruction to view the image data is given.

54. The computer readable medium storing the image processing program according to claim 49, wherein the importance level point recording function records the importance level point information in additional information of the image data or metadata different from the image data.

55. The computer readable medium storing the image processing program according to claim 49, causing the computer to further implement:

a backup function which backs up the image data stored with the image storing function to another storing function;

a backup instruction function which gives an instruction to execute the backup; and a function which records the importance level point if the instruction to execute the backup is given.

56. The computer readable medium storing the image processing program according to claim 49, causing the computer to further implement:

a view instruction function which gives an instruction to view image data stored with the image storing function; and an image displaying function which displays the image data so as to clearly indicate the importance level point information if the instruction to view the image data is given.

\* \* \* \* \*